US008899571B2

(12) United States Patent
Nishikawa

(10) Patent No.: US 8,899,571 B2
(45) Date of Patent: Dec. 2, 2014

(54) SHEET-THROUGH DOCUMENT READING APPARATUS

(71) Applicant: Konica Minolta Business Technologies, Inc., Tokyo (JP)

(72) Inventor: Hiroshi Nishikawa, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 59 days.

(21) Appl. No.: 13/623,795

(22) Filed: Sep. 20, 2012

(65) Prior Publication Data

US 2013/0077137 A1  Mar. 28, 2013

(30) Foreign Application Priority Data

Sep. 22, 2011 (JP) .................................. 2011-206876

(51) Int. Cl.
*B65H 83/00* (2006.01)
*H04N 1/00* (2006.01)
*H04N 1/193* (2006.01)
*H04N 1/12* (2006.01)

(52) U.S. Cl.
CPC ............ *H04N 1/00588* (2013.01); *H04N 1/193* (2013.01); *H04N 1/12* (2013.01); *H04N 1/00713* (2013.01); *H04N 1/00689* (2013.01); *H04N 1/00694* (2013.01); *H04N 2201/0081* (2013.01); *H04N 1/00774* (2013.01); *H04N 1/00652* (2013.01); *H04N 1/00602* (2013.01)
USPC ........................... 271/3.14; 271/3.15; 271/270

(58) Field of Classification Search
CPC .......... H04N 1/00588; H04N 1/00602; H04N 1/00652; H04N 1/00689; H04N 1/00694; H04N 1/00713; H04N 1/00774
See application file for complete search history.

(56) References Cited

U.S. PATENT DOCUMENTS

| 5,907,759 A * | 5/1999 | Yashiro ........................ 399/371 |
| 5,995,801 A | 11/1999 | Katsuta et al. |
| 6,206,359 B1 * | 3/2001 | Hirota et al. ................. 271/3.15 |

(Continued)

FOREIGN PATENT DOCUMENTS

| CN | 101070123 A | 11/2007 |
| JP | 6-312852 | 11/1994 |

(Continued)

OTHER PUBLICATIONS

Notification of Reasons for Refusal mailed Dec. 3, 2013, directed to JP Application No. 2011-206876; 7 pages.

(Continued)

*Primary Examiner* — Kaitlin Joerger
(74) *Attorney, Agent, or Firm* — Lucas & Mercanti, LLP

(57) ABSTRACT

A sheet-through document reading apparatus including: a document tray for containing a plurality of documents; a determination unit that determines a length of a document on the document tray; a feed unit that separates and feeds a document on the document tray; a resist convey unit that performs consistency processing on the document fed by the feed unit; a first drive unit that rotationally drives the resist convey unit; a read convey unit that feeds the document subjected to consistency processing by the resist convey unit; a second drive unit that rotationally drives the read convey unit; a reading unit that reads, at a fixed reading position, the document conveyed by the read convey unit; and a control unit for changing a relative conveying velocity between the resist convey unit and the read convey unit on the basis of a result of the determination by the determination unit.

17 Claims, 12 Drawing Sheets

(56) References Cited

U.S. PATENT DOCUMENTS

| | | | |
|---|---|---|---|
| 6,648,320 B2 * | 11/2003 | Iino et al. | 271/3.15 |
| 7,339,654 B2 * | 3/2008 | Mizubata et al. | 355/407 |
| 7,880,933 B2 * | 2/2011 | Okawa | 358/3.26 |
| 8,348,269 B2 * | 1/2013 | Oshima | 271/265.01 |
| 2007/0211312 A1 * | 9/2007 | Tokutsu | 358/498 |
| 2007/0284804 A1 | 12/2007 | Takata et al. | |
| 2010/0276863 A1 | 11/2010 | Yano | |

FOREIGN PATENT DOCUMENTS

| | | | | |
|---|---|---|---|---|
| JP | 06312852 A | * | 11/1994 | B65H 7/02 |
| JP | 8-85649 | | 4/1996 | |
| JP | 08085649 A | * | 4/1996 | B65H 9/14 |
| JP | 8-310679 | | 11/1996 | |
| JP | 10-87110 | | 4/1998 | |
| JP | 11-193148 | | 7/1999 | |
| JP | 2001146337 | | 5/2001 | |
| JP | 2010-275113 | | 12/2010 | |
| JP | 2010275113 A | * | 12/2010 | |

OTHER PUBLICATIONS

Notification of Reasons for Refusal dated Jul. 15, 2014 issued in corresponding Chinese Patent Application No. 2012-10345180.0 and English translation.

* cited by examiner

SHEET-THROUGH DOCUMENT READING APPARATUS

CROSS REFERENCE TO RELATED APPLICATION

The present application claims priority from Japanese Patent Application No. 2011-206876 filed on Sep. 22, 2011, the entire contents of which are hereby incorporated by reference into this application.

BACKGROUND OF THE INVENTION

1. Field of the Invention

The present invention relates to sheet-through document reading apparatuses, particularly to a document reading apparatus operable to purposely form a slack in a document between a resist convey unit and a read convey unit.

2. Description of Related Art

In conventional document reading apparatuses, each document placed on a document tray is conveyed to an image reading portion after passing a separation roller, a resist roller, and a read roller, as described in Japanese Patent Laid-Open Publication No. 2001-146337. Here, document conveying velocity $v_1$ at the resist roller is set slightly higher than conveying velocity $v_2$ at the read roller, so that a slack is formed in the document in a U-turn path between the resist roller and the read roller. As a result, a velocity variation at the time of the trailing edge of the document exiting the nip of the separation roller is accommodated by the slack formed in the document.

However, such conventional document reading apparatuses have a problem of not being able to set an appropriate amount of the slack in accordance with the length of a document.

Furthermore, the conventional document reading apparatuses have another problem of not being able to set an appropriate amount of the slack in accordance with the grammage of a document. Specifically, if a thick, i.e., high grammage, document is conveyed, the resist roller readily causes slippage, so that the actual conveying velocity of the resist roller becomes unstable. As a result, an amount of the slack to be formed in the document in the U-turn path fluctuates in accordance with the grammage.

SUMMARY OF THE INVENTION

A sheet-through document reading apparatus according to the present invention includes: a document tray on which a plurality of documents are capable of being placed; a determination unit operable to determine a length and/or a grammage of a document on the document tray; a feed unit operable to separate and feed a document on the document tray; a resist convey unit operable to perform consistency processing on the document fed by the feed unit; a first drive unit operable to rotationally drive the resist convey unit; a read convey unit operable to feed the document subjected to consistency processing by the resist convey unit; a second drive unit operable to rotationally drive the read convey unit; a reading unit operable to read, at a fixed reading position, the document conveyed by the read convey unit; and a control unit for changing a relative conveying velocity between the resist convey unit and the read convey unit on the basis of a result of the determination by the determination unit.

DETAILED DESCRIPTION OF THE PREFERRED EMBODIMENTS

First Embodiment

Figure 1:
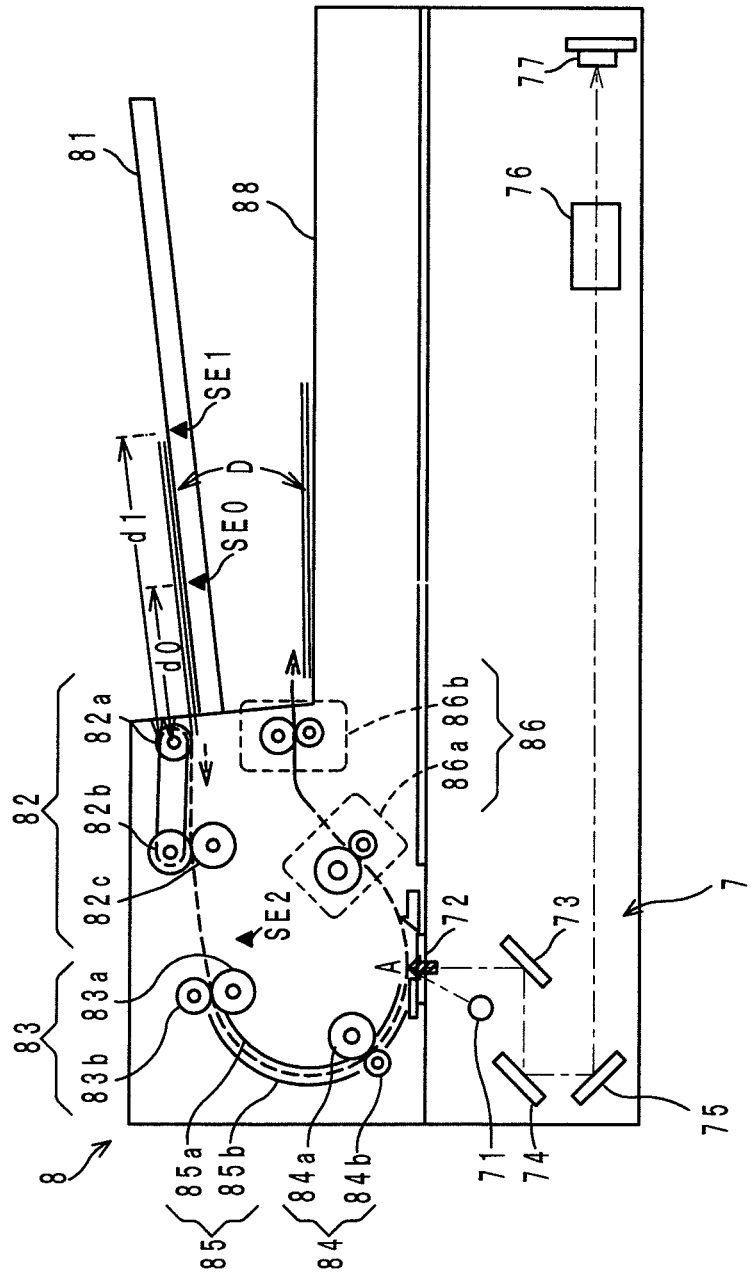
FIG. 1 is a schematic view illustrating a general configuration of a document reading apparatus according to a first embodiment.

A document reading apparatus shown in FIG. 1 is provided in a copier, a multifunction peripheral (MFP), or the like, and generally includes a scanner 7, which is an example of a fixed optical reading unit, and an automatic document feeder (referred to below as an "ADF") 8.

The scanner 7 is fixed immediately below a reading position A to perform sequential line-by-line reading of a document D passing the reading position A. Specifically, in the scanner 7, a lamp 71 such as an LED emits light toward the reading position A via a reading glass 72. Light reflected by the document D in the reading position A is incident on an imaging lens 76 via mirrors 73, 74, and 75, and thereafter forms an image on an image pickup portion 77 such as CCD color line sensor.

Figure 2:
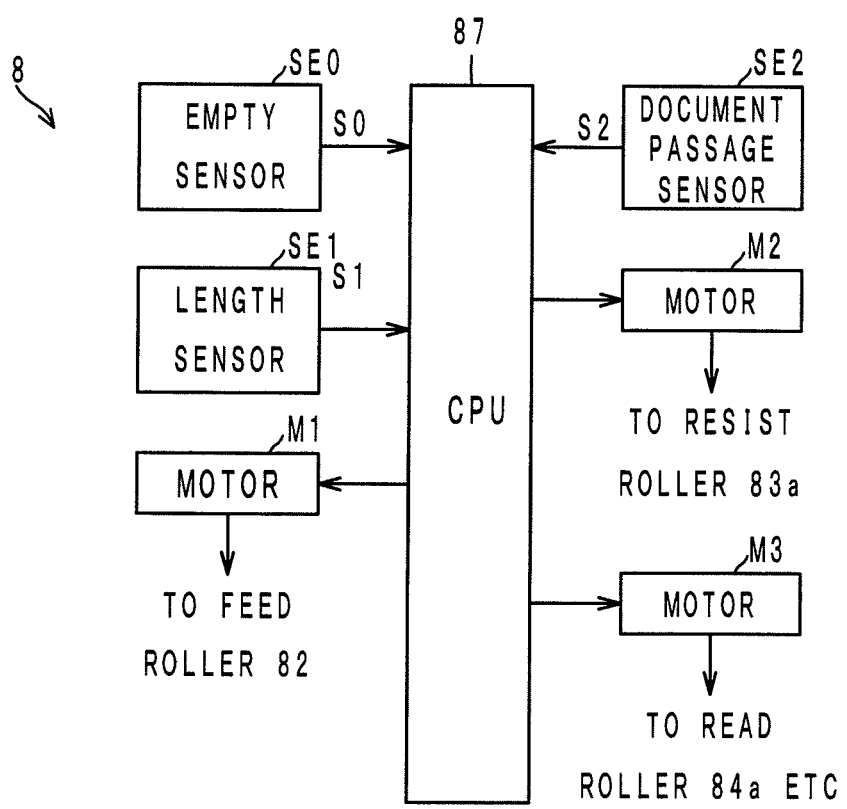
FIG. 2 is a schematic diagram illustrating a block configuration of an automatic document feeder (ADF) of FIG. 1.

The ADF 8 includes a tray 81, a feed unit 82, a resist convey unit 83, a read convey unit 84, a guide unit 85, an output unit 86, a CPU 87, and an output tray 88, as shown in FIGS. 1 and 2.

The tray 81 is configured in such a manner that document D to be read by the scanner 7 can be placed thereupon. Moreover, to detect a document size, the tray 81 is equipped with an empty sensor SE0 and a length sensor SE1. The sensors SE0 and SE1 are reflective photosensors or suchlike, and are disposed at distances d0 and d1, respectively, from a reference position (e.g., the position of the leading edge of the document D) within the area where the document D is placed. The sensors SE0 and SE1 emit light toward the placement area, and output signals S0 and S1, respectively, to the CPU 87 upon reception of reflected light. In the present embodiment, d1 is 170 millimeters [mm], for example. In this case, the signal S1 indicates that the placed document D has a side measuring 170 mm or more along a supply direction. The value of d0 is smaller than d1, and the signal S0 indicates that the document D is placed on the tray 81.

The feed unit 82 is provided on the downstream side of the tray 81, and includes a pickup roller 82a, a feed roller 82b, a separation roller 82c, and a motor M1 for rotationally driving the feed roller 82b. The pickup roller 82a is connected to the feed roller 82b so as to be rotatable in synchronization therewith. The feed roller 82b has an outer diameter of 20.0 mm, for example, and is rotated by a driving force from the motor M1, thereby feeding the document D at a conveying velocity of 440 millimeters per second [mm/s], for example. The separation roller 82c receives a load torque of 500 gram force centimeters [gf·cm], for example, from an unillustrated torque limiter.

Here, strictly, for the "conveying velocity" at which to feed a sheet by each roller, it is necessary to consider slipping of the sheet and deformation of the roller, but unless otherwise indicated below, a design conveying velocity obtained by multiplying the outer diameter of the roller, the circumference ratio, and the number of revolution (rpm) of the roller will be referred to simply as a "conveying velocity" or as a "control conveying velocity". The conveying velocity is controlled by the CPU 87 controlling the number of revolution of each motor. On the other hand, a conveying velocity considering sheet slippage due to load torque, for example, will be referred to as a "feed rate" or an "actual conveying velocity".

The resist convey unit 83 is provided on the downstream side of the feed unit 82, and includes a resist roller 83a, a pinch roller 83b in contact therewith, a motor M2, which is an example of a first drive unit, and a document passage sensor SE2. The resist roller 83a has an outer diameter of 20.1 mm, for example. The conveying velocity at which the resist roller 83a feeds a document is determined on the basis of a driving force from the motor M2. As will be described in detail later, the conveying velocity is set under control of the CPU 87 in accordance with the length of the document D. The sensor SE2 is a reflective photosensor, for example, and is disposed slightly on the upstream side of the nip between the rollers 83a and 83b. The sensor SE2 emits light toward the conveyance path, and outputs a signal S2, which indicates whether the light is reflected or not, to the CPU 87.

The read convey unit 84 is provided on the downstream side of the resist convey unit 83, and includes a read roller 84a, a pinch roller 84b in contact therewith, and a motor M3, which is an example of a second drive unit. The read roller 84a has an outer diameter of 20.0 mm, for example. The conveying velocity at which the read roller 84a feeds a document is predetermined by a driving force of the motor M3. The conveying velocity is 250 mm/s, for example. Note that it is preferable that the conveying velocity of the read roller 84a be invariably set at 250 mm/s because accuracy of reading by the scanner 7 can be stabilized.

The guide unit 85 includes outer and inner guide members 85a and 85b. These guide members 85a and 85b form a U-turn path for the document D between the resist roller 83a and the read roller 84a. The guide members 85a and 85b are desirably spaced 2.0 mm to 3.0 mm apart from each other.

The output unit 86 is provided on the downstream side of the read convey unit 84, and includes a plurality of roller pairs 86a and 86b. These roller pairs 86a and 86b are connected to the motor M3 of the read convey unit 84, and are rotated by the driving force thereof.

Figure 3:
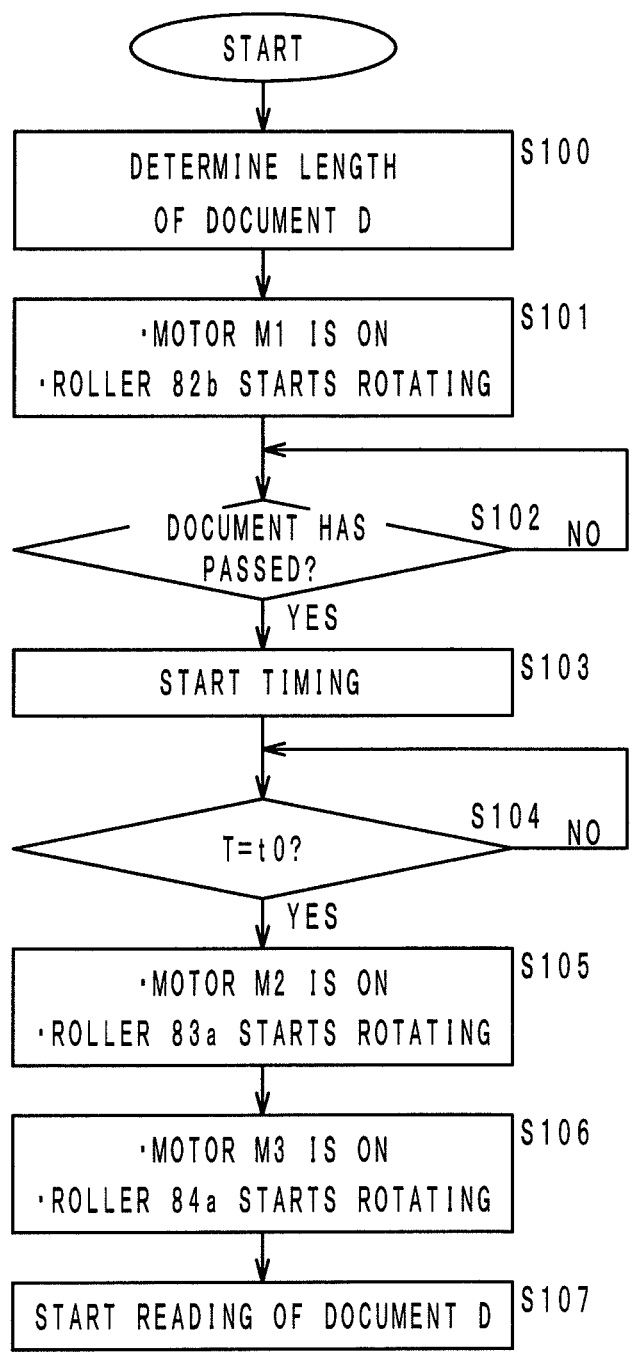
FIG. 3 is a flowchart illustrating the operation of the ADF of FIG. 1.

Next, referring to a flowchart of FIG. 3, the operation of the document reading apparatus will be described. The user places a document D on the tray 81, and then presses a start button of an unillustrated operating panel. In response to this, the CPU 87 determines whether the length of the document D on the tray 81 is or is not 170 mm or more on the basis of output signals S0 and S1 of the sensors SE0 and SE1, and memorizes the result of the determination (i.e., the length of the document D) (S100).

Furthermore, the motor M1 starts rotationally driving the feed roller 82b under control of the CPU 87 (S101). The pickup roller 82a is also rotated in synchronization with the feed roller 82b. As a result, the document(s) D is/are picked up from the tray 81 to be fed to the nip between the rollers 82b and 82c. If a sheet of document D is picked up, it is fed from between the rollers 82b and 82c toward the resist convey unit 83. Note that if sheets of documents D are picked up, the separation roller 82c is rotated in an opposite direction to the feed roller 82b by the action of the torque limiter, so that the sheets of documents D are returned to the tray 81.

If the CPU 87 determines the document D to have passed over the sensor SE2 after the driving of the motor M1 started, on the basis of an output signal S2 of the sensor SE2 (S102), the CPU 87 starts timing with a timer (not shown) (S103). If the count value T of the timer reaches predetermined time t0 (S104), the motor M2 starts rotationally driving the resist roller 83a under control of the CPU 87 (S105). Here, in accordance with the length of the document D determined in S100, the conveying velocity at the resist roller 83a is set to a value obtained by multiplying the conveying velocity at the read roller 84a, 250 mm/s, by a predetermined conveying velocity ratio, either the following first or second conveying velocity ratio K1 or K2.

For documents D 170 mm or longer: K1=1.0075
For documents D less than 170 mm long: K2=0.9874

As a result of these processing steps, the resist convey unit 83 performs skew correction, which is an example of document consistency processing. Specifically, the document D from the feed unit 82 is initially hit against the nip between the rollers 83a and 83b that are not in rotation. By the time T=t0, an initial slack is formed in the document D, whereby leading edge thereof coincides with the nip. If T=t0, the resist roller 83a starts document feeding at the conveying velocity of the read roller 84a multiplied by the conveying velocity ratio K. As a result, the document D is fed from the resist roller 83a to enter between the outer guide member 85a and the inner guide member 85b.

After the driving of the motor M2 starts, the motor M3 starts rotationally driving the read roller 84a under control of the CPU 87 (S106). The document D is conveyed through the guide unit 85 to the nip between the rollers 84b and 84c. The document D is further fed from between the rollers 84a and 84b, which are being rotated, to the reading position A shown in FIG. 1 at a conveying velocity of 250 mm/s. Moreover, during this period, a slack is formed in the document D within the guide unit 85 in accordance with the difference in feed rate between the resist convey unit 83 and the read convey unit 84.

Furthermore, after the document D reaches the reading position A, the scanner 7 starts sequential line-by-line reading of the document D (S107). Thereafter, the document D passes through the roller pairs 86*a* and 86*b* of the output unit 86 from its leading edge, to be ejected to the output tray 88. The operation as described above continues until the document D is entirely read to its trailing edge, and is completely ejected to the output tray 88.

Incidentally, as described in the "Description of Related Art" section, the conventional document reading apparatuses have the problem of not being able to set an appropriate slack in accordance with the length of the document D. Specifically, if the document is relatively long in the conveying direction, it might be situated on all of the separation roller, the resist roller, and the read roller at the same time. In such a case, load torque applied by the separation roller facilitates slippage on the resist roller, so that, while the document that is being conveyed lies on all of the rollers, the actual conveying velocity at the resist roller is relatively lower than the actual conveying velocity at the read roller. In contrast, if the document is relatively short in the conveying direction, it might be situated on both the resist roller and the read roller at the same time but not on the separation roller. In such a case, the documents is not affected by the load torque of the separation roller, and, while the document that is being conveyed lies on the resist roller and the read roller, the actual conveying velocity at the resist roller is relatively higher than the actual conveying velocity at the read roller. As understood from the above, the actual conveying velocity at the resist roller fluctuates in accordance with the document length, resulting in fluctuations in the amount of the slack to be formed in the U-turn path at the time of the trailing edge of the document exiting the resist roller.

In addition to this problem, technical advantages of the present document reading apparatus will be described in detail with reference to FIGS. 4A, 4B, 5A and 5B.

Figure 4A:
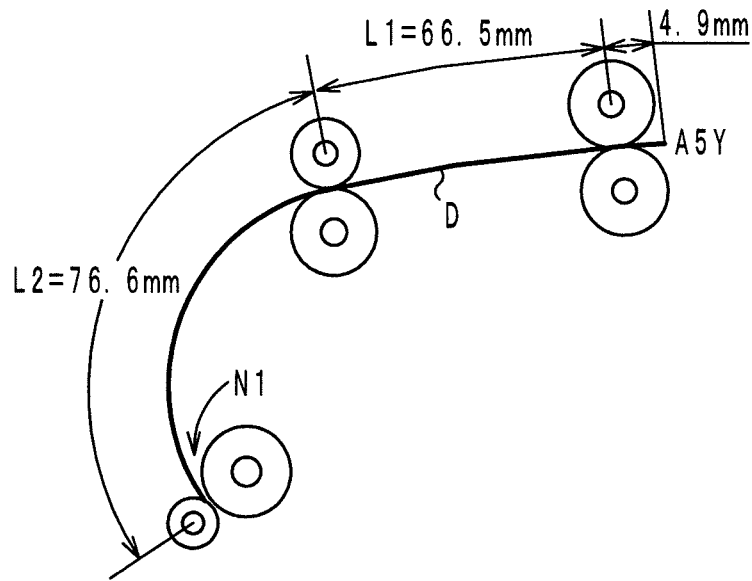
FIG. 4A is a schematic diagram illustrating path lengths of primary portions in the ADF.
Figure 4B:
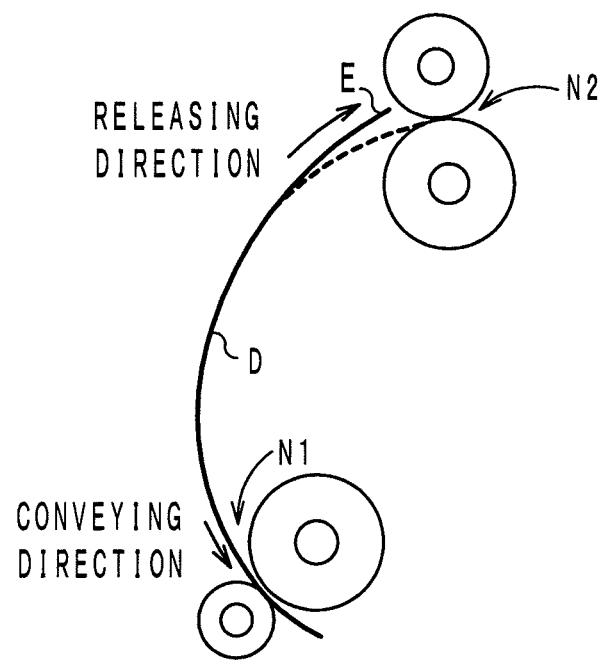
FIG. 4B is a schematic diagram illustrating the behavior of the trailing edge of a document exiting the nip of resist roller.

In the present document reading apparatus, as shown in FIG. 4A, conveyance path length L1 from the separation roller to the resist roller is assumed to be approximately 66.5 mm, and conveyance path length L2 from the resist roller to the read roller is assumed to be approximately 76.6 mm. Moreover, an A5Y document D is assumed to be conveyed through the paths. Here, the A5Y document D refers to an A5 size document D to be conveyed along its short side (148 mm long). It is also assumed that the conveying velocity of the resist roller is simply set higher than the conveying velocity of the read roller without considering the length of the document D. Under the above assumptions, load torque only affects the document D up to 4.9 mm into the nip N1 of the read roller. Accordingly, in the document D, an excess slack is formed on the U-turn path. If the document D has an excess slack, when the trailing edge E of the document D exits the nip N2 of the resist roller, and the excess slack is released, as shown in FIG. 4B, only a velocity component for an opposite direction (i.e., releasing direction) to the conveying direction is applied to the document D, resulting in a sharp decline in the actual conveying velocity of the document D.

Figure 5A:
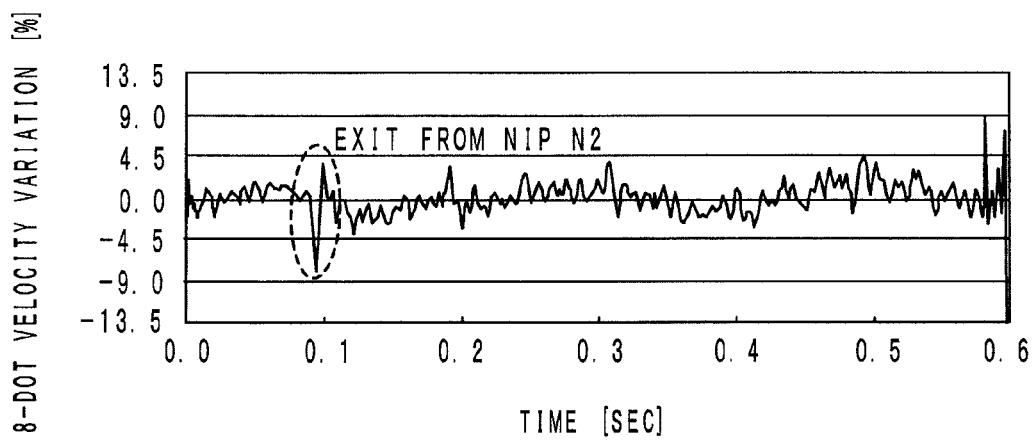
FIG. 5A is a graph showing measurement results for velocity variations upon conveyance of A5Y documents.

The inventor actually measured velocity variations during conveyance of A5Y documents D using the document reading apparatus, and the measurement results were obtained as shown in FIG. 5A. In FIG. 5A, the dot velocity variation rate is a simulation value of color deviation due to velocity variations among eight dots, where 0% represents no color deviation and 4.5% represents 15-micron color deviation. Until about 0.09 seconds, the document D were present in the nip N2, so the 8-dot velocity variation rate fluctuated around approximately 0 (%), but immediately after 0.09 seconds at which the trailing edges of the documents D exited the nip N2, the 8-dot velocity variation rate sharply declined to its minimum value of about −8%, and sharply rose to its maximum value of about 4% immediately thereafter (see the ovally encircled portion in the figure). The inventor aims for the 8-dot velocity variation rate to be in the range of from −4.5% to 4.5%, and therefore the velocity variations falling to about −8% are considerably large.

Figure 5B:
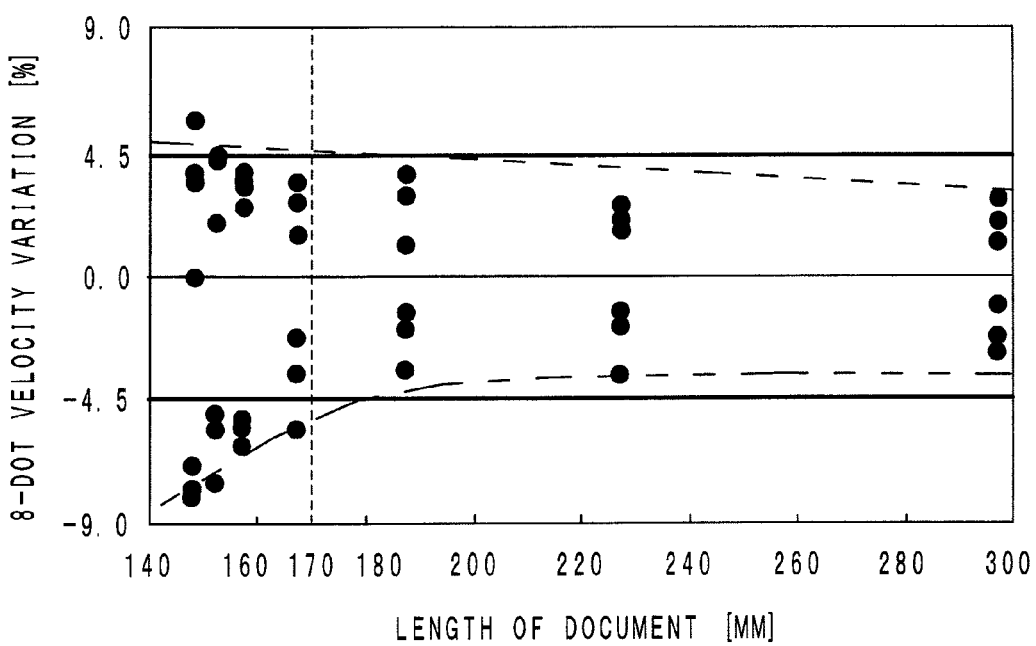
FIG. 5B is a graph showing velocity variation versus document length.

Next, referring to FIG. 5B, the relationship between the length of documents D and velocity variations will be described. The inventor measured the maximum and minimum values of the 8-dot velocity variation rate at the time of thin documents D of various lengths (grammage: 50 grams per square meter [g/m$^2$]; documents D measuring a width of 210 mm) exiting the nip N2 where three sheets were conveyed for each length type, and the measured values were plotted as solid circles, as shown in FIG. 5B. It was appreciated from the results that the 8-dot velocity variation rate exceeded the aforementioned target range if the length was 170 mm or less.

Figure 6A:
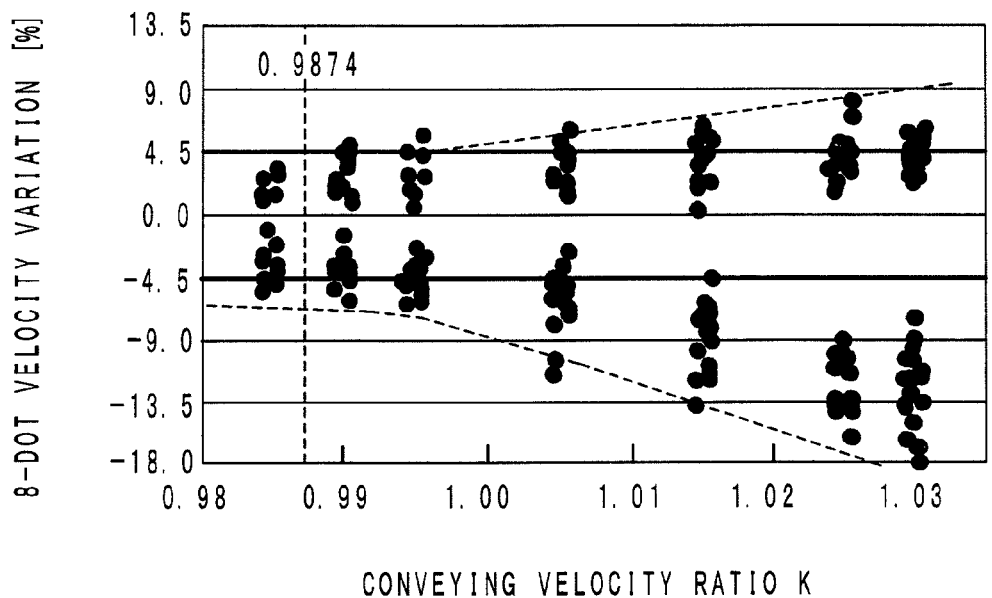
FIG. 6A is a graph showing measurement results for the maximum and minimum values of an 8-dot velocity variation rate upon conveyance of A5Y documents at a conveying velocity ratio K.

On the basis of the above measurement results, the inventor selected 170 mm as the threshold for the length determination in S100. Note that among the documents D measuring a length of 170 mm or less, the only type of document that can be conveyed by the actual document reading apparatus is A5Y. In view of this, the inventor measured the maximum and minimum values of the 8-dot velocity variation rate at the time of A5Y documents D exiting the nip N2 where the conveying velocity ratio K was set at various values, and the measured values were plotted as solid circles, as shown in FIG. 6A. From the measurement results, it was confirmed that the conveying velocity ratio K needs to be approximately 0.9874.

Figure 6B:
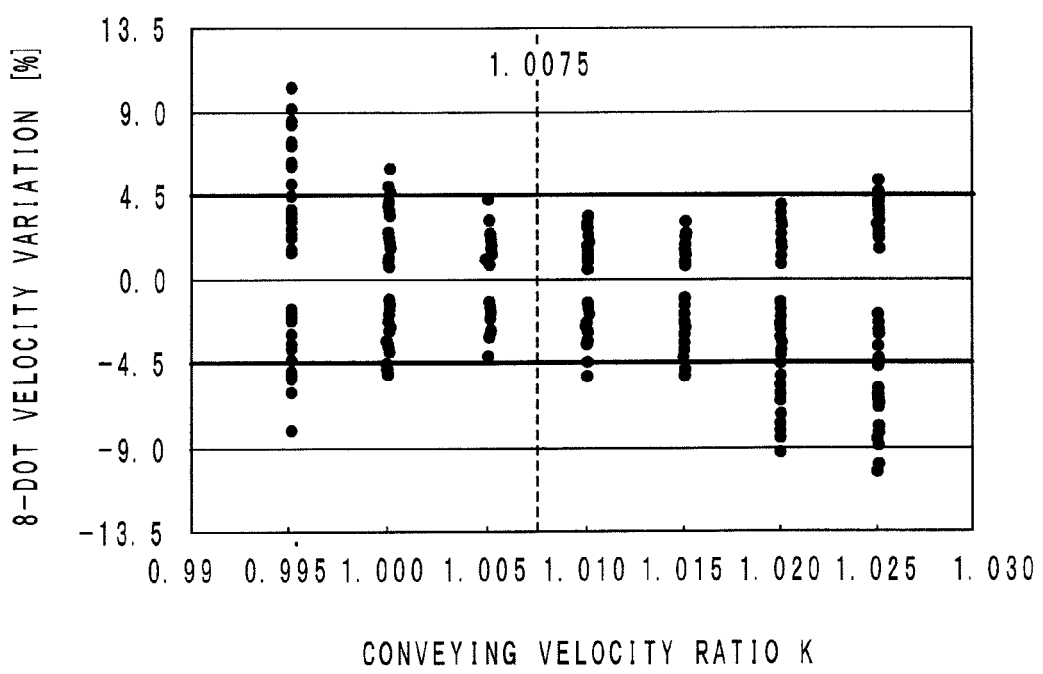
FIG. 6B is a graph showing measurement results for the maximum and minimum values of an 8-dot velocity variation rate upon conveyance of A5T or larger documents at a conveying velocity ratio K.

Furthermore, the inventor also conducted the same measurements on documents D of A5T or larger (documents D with a length greater than or equal to the long side of A5 size). The results are shown in FIG. 6B. From the measurement results, it was confirmed that the conveying velocity ratio K needs to be approximately 1.0075.

Note that the above phenomenon did not appear where the load torque of the separation roller was 450 gf·cm, but it was confirmed at 500 gf·cm or higher. If documents D to be used are made of a relatively inexpensive material which is coarsely fibrous and less smooth, frictional resistance between the documents D is relatively high, so that the documents D cannot be readily separated from one another. Moreover, if documents D are conveyed at relatively high speed in order to improve reading productivity, slippage readily occurs between the documents D and the separation roller, so that the documents D cannot be readily separated from one another. As a result, multifeeding where more than one sheet of document D are conveyed at a time readily occurs. To support such various types of document D, and also to meet users' need to perform document reading with high productivity, it is necessary to secure feeding performance by raising separation torque (load torque) of the separation roller, and therefore, after studies, the inventor considered values of 500 gf·cm or more as appropriate. In this manner, for the velocity variations, the load torque of the separation roller is preferably low, but if the load torque is reduced, problems such as poor document separation and multifeeding occur, so the latter was prioritized, and the load torque of the separation roller was set at 500 gf·cm or higher. A solution to the former, the problem with the velocity variations, was offered by controlling the conveying velocity as described earlier in the first embodiment.

Note that in the case of long documents D such as A3 size, the load torque causes the actual conveying velocity (feed rate) at the resist roller to be lower than the design value, i.e., the control conveying velocity 250 mm/s×1.0075, as described in the "Description of Related Art" section. However, in the present document reading apparatus, the space between the guide members 85a and 85b is selected to be in the range of from 2.0 mm to 3.0 mm, and a slack is formed in the document D within the space, so that no problem is caused even if the conveying velocity is reduced as described above. Note that more than 3.0 mm is not preferable because skew might be caused particularly in the case of thin documents D.

As described above, the present document reading apparatus uses the conveying velocity ratio K=1.0075 for long documents D, so that the control conveying velocity of the resist roller 83a relative to the read roller 84a is relatively high. Accordingly, it is possible to deal with slippage at the resist roller 83a due to load torque, and optimize the actual conveying velocity at the resist roller 83a. On the other hand, the conveying velocity ratio K=0.9874 is used for short documents D, so that the control conveying velocity of the resist roller 83a relative to the read roller 84a is relatively low. As a result, it is possible to support documents D less affected by the load torque and optimize the actual conveying velocity at the resist roller 83a. Thus, the present document reading apparatus allows a document D to be slackened with an appropriate amount of the slack previously obtained by actual measurements, in accordance with a determination result for the length of the document D.

Second Embodiment

Described next is a document reading apparatus according to a second embodiment whose features and processing steps equivalent to those of the document reading apparatus in the first embodiment will be denoted by the same reference characters or step numbers, and any descriptions thereof will be omitted.

Figure 7:
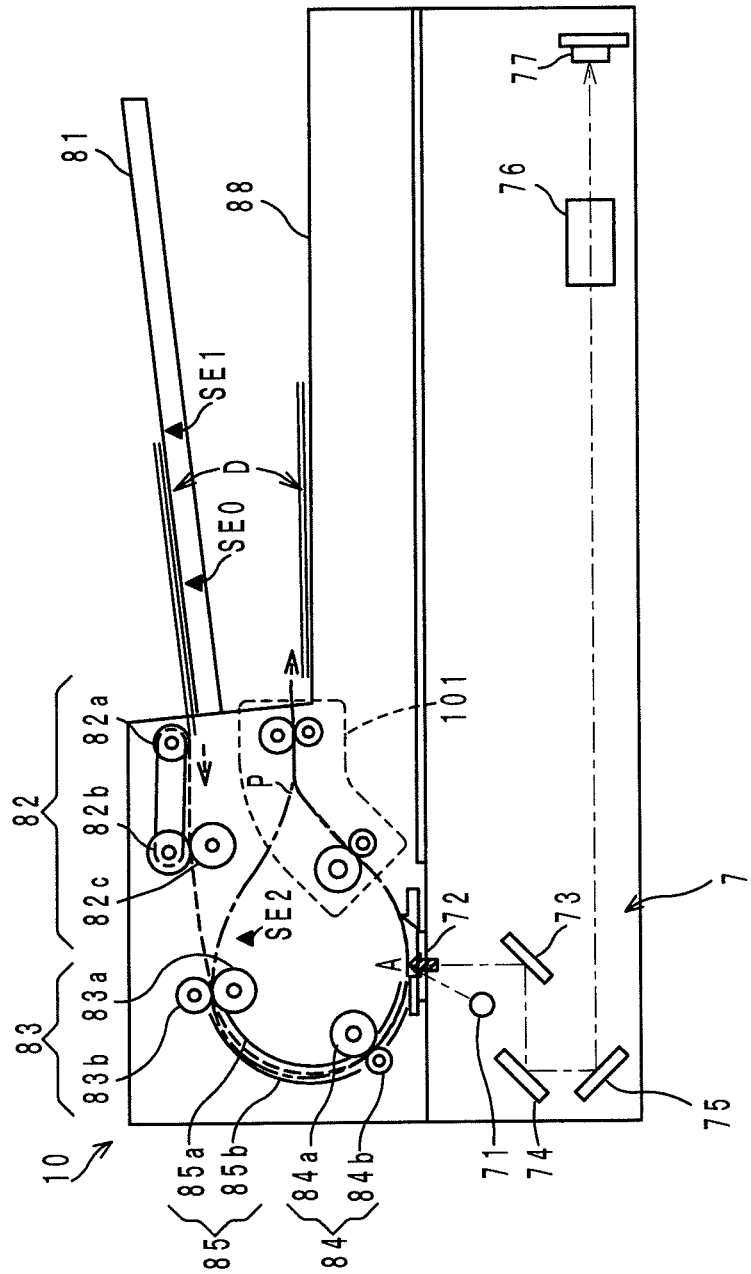
FIG. 7 is a schematic view illustrating a general configuration of a document reading apparatus according to a second embodiment.

In FIG. 7, an ADF 10 differs from the ADF 8 shown in FIG. 1 in that it further includes a switchback path (indicated by a long-dashed, short-dashed line in the figure) P for reversing the side of a document D which passed the reading position A and refeeding it to the upstream side of the reading position A (i.e., to the resist roller 83a) so that both sides of the document D can be read. To form the switchback path P, the ADF 10 includes a side-reversing convey/output unit 101 in place of the output unit 86 shown in FIG. 1. Note that the side-reversing convey/output unit 101 is well known, and therefore any illustration and description thereof will be omitted.

Figure 8:
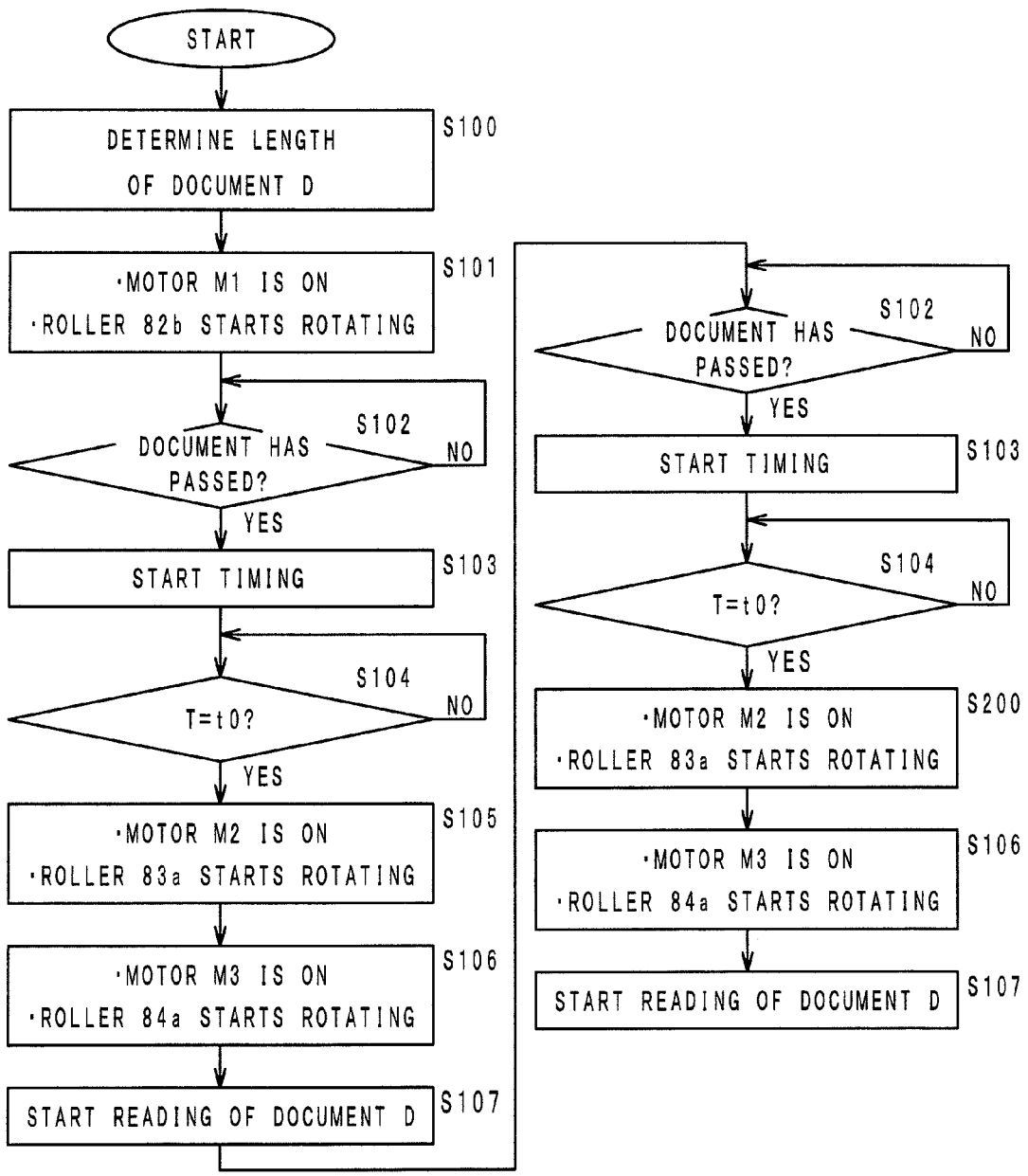
FIG. 8 is a flowchart illustrating the operation of an ADF of FIG. 7.

Next, referring to a flowchart of FIG. 8, the operation of the present document reading apparatus will be described. The user places a document D on the tray 81, then presses a double-side reading mode button of an unillustrated operating panel, and further presses a start button. In response to this, the CPU 87 executes S100 to S107. As a result, the obverse side of the document D is read, and then the document D is reversed (i.e., it is caused to switch back) by the side-reversing convey/output unit 101 and reconveyed to the resist roller 83a.

Thereafter, the CPU 87 executes S102 to S104, which are the same as described above. Then, the motor M2 starts rotationally driving the resist roller 83a (S200). Here, in accordance with the length of the document D determined in S100, the conveying velocity of the resist roller 83a is set to a value for reading the reverse side of the document D, the value being obtained by multiplying the conveying velocity of the read roller 84a, 250 mm/s, by a predetermined conveying velocity ratio, either the following third or fourth conveying velocity ratio K3 or K4.

For the reverse sides of documents D 170 mm or longer:
K3=1.0000 (for the obverse sides, K1=1.0075, as mentioned earlier)

For the reverse sides of documents D less than 170 mm:
K4=0.9899 (for the obverse sides, K2=0.9874, as mentioned earlier)

By this series of processing steps S102 to S104 and S200, the document D is fed from the resist roller 83a to between the outer guide 85a and the inner guide 85b at the conveying velocity obtained by multiplying the conveying velocity 250 mm/s by the third or fourth conveying velocity ratio K3 or K4 being set.

After the driving of the motor M2 starts, the CPU 87 executes S106, which is the same as described above. As a result, the document D is fed at the same conveying velocity as in the first embodiment to the reading position A shown in FIG. 7. After the obverse side of the document D is read by the scanner 7, the document D is outputted to the output tray 88 via the side-reversing convey/output unit 101 (S107). The operation up to S107 continues until the document D is entirely read to its trailing edge, and is completely ejected to the output tray 88.

Incidentally, in the case of passing through the switchback path P, the document D does not pass through the nip between the feed roller 82b and the separation roller 82c, and therefore is not affected by load torque regardless of the length. Therefore, the feed of the document D by the resist roller is relatively high compared to the case where the obverse side is read. Moreover, in the case where both sides of documents D are read, the documents D pass through the switchback path P twice to arrange pages of the documents on the output tray 88 in proper order, as is well known. Therefore, it is necessary to consider damage to the documents D.

Figure 9A:
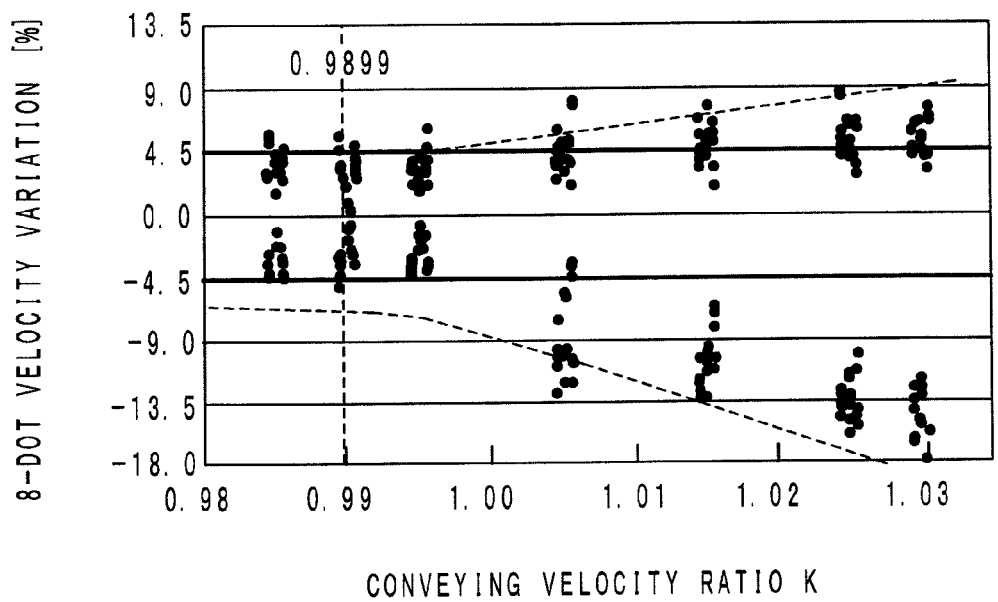
FIG. 9A is a graph showing measurement results for the maximum and minimum values of an 8-dot velocity variation rate upon A5Y documents being conveyed with reverse-side up at a conveying velocity ratio K.
Figure 9B:
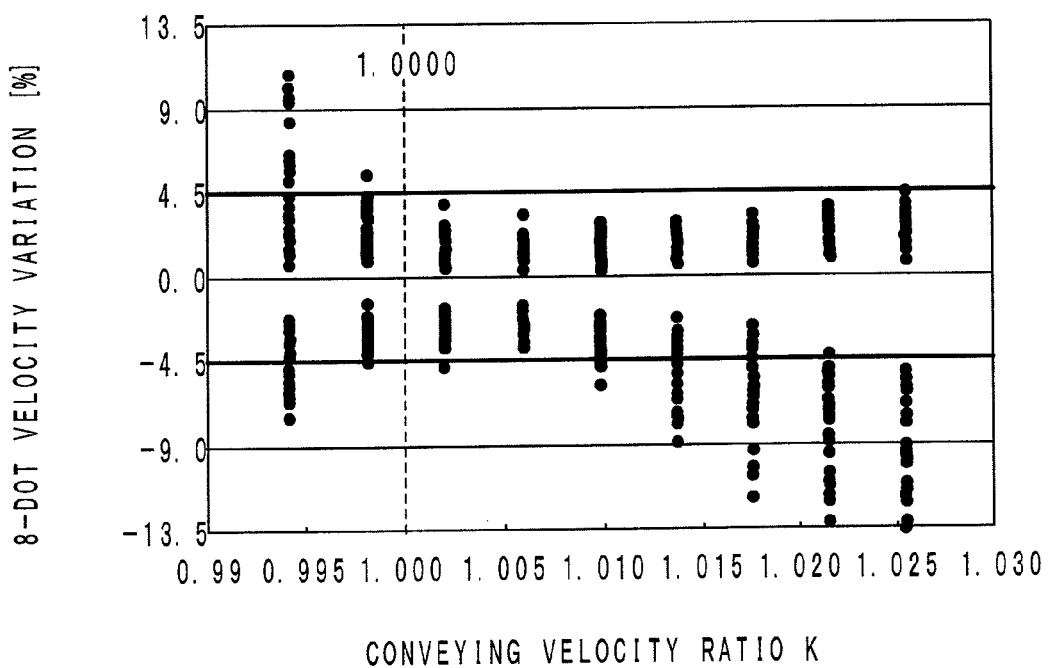
FIG. 9B is a graph showing measurement results for the maximum and minimum values of an 8-dot velocity variation rate upon A5T or larger documents being conveyed with reverse-side up at a conveying velocity ratio K.

In consideration of an increase in the feed and damage to documents D, the resist roller 83a and the read roller 84a are desirably set to feeding velocities for reverse-side reading, which are different from the feeding velocities for obverse-side reading. Specifically, for documents D of the same size, either A5T or larger (documents D with a length greater than or equal to the long side of A5 size), the conveying velocity ratio K of the resist roller 83a is set lower upon reverse-side reading than upon obverse-side reading. The inventor actually measured the maximum and minimum values of the 8-dot velocity variation rate at the time of A5T or larger documents D exiting the nip N2 during conveyance along the switchback path P where the conveying velocity ratio K was set at various values, and the measured values were plotted as solid circles, as shown in FIG. 9B. From the measurement results, it was confirmed that the conveying velocity ratio K (K3) for reverse side needs to be approximately 1.0000, which is lower than the conveying velocity ratio K1 for obverse side, i.e., 1.0075.

Furthermore, the inventor conducted the same measurements on A5Y documents D. The results are shown in FIG. 9A. From the measurement results, it was confirmed that the conveying velocity ratio K needs to be approximately 0.9899.

Modifications to First and Second Embodiments

In the first and second embodiments, the conveying velocity of the resist roller 83a is set at a value obtained by multiplying the conveying velocity of the read roller 84a, 250 mm/s, by a predetermined conveying velocity ratio. However, this is not restrictive, and the conveying velocity of the read roller 84a may be set at a value obtained by multiplying a preset conveying velocity of the resist roller 83a by a conveying velocity ratio determined on the basis of actual measurements.

Further, in the first and second embodiments, the CPU 87 determines the length of documents D to be either of two types by using 170 mm as a threshold, but the number of such types for determination may be three or more.

Still further, in the first and second embodiments, the length of documents D is determined on the basis of an output signal SO of the sensor SE0 and an output signal S1 of the sensors SE1 provided on the tray 81. However, this is not restrictive, and other determination methods, such as manual input by the user, may be employed.

Yet further, in the first and second embodiments, in the case of a mixed size mode where documents D of different lengths are placed together on the tray, the conveying velocity ratio K is set in accordance with the maximum length. For example, in the case where A5Y documents D and A4Y documents D are placed together, the conveying velocity ratio K is set in accordance with the length of A4Y.

Furthermore, in the second embodiment, a resist convey unit for reverse side may be provided on the switchback path P.

Third Embodiment

Described next is a document reading apparatus according to a third embodiment whose features and processing steps equivalent to those of the document reading apparatus in the first embodiment will be denoted by the same reference characters or step numbers, and any descriptions thereof will be omitted.

Figure 10:
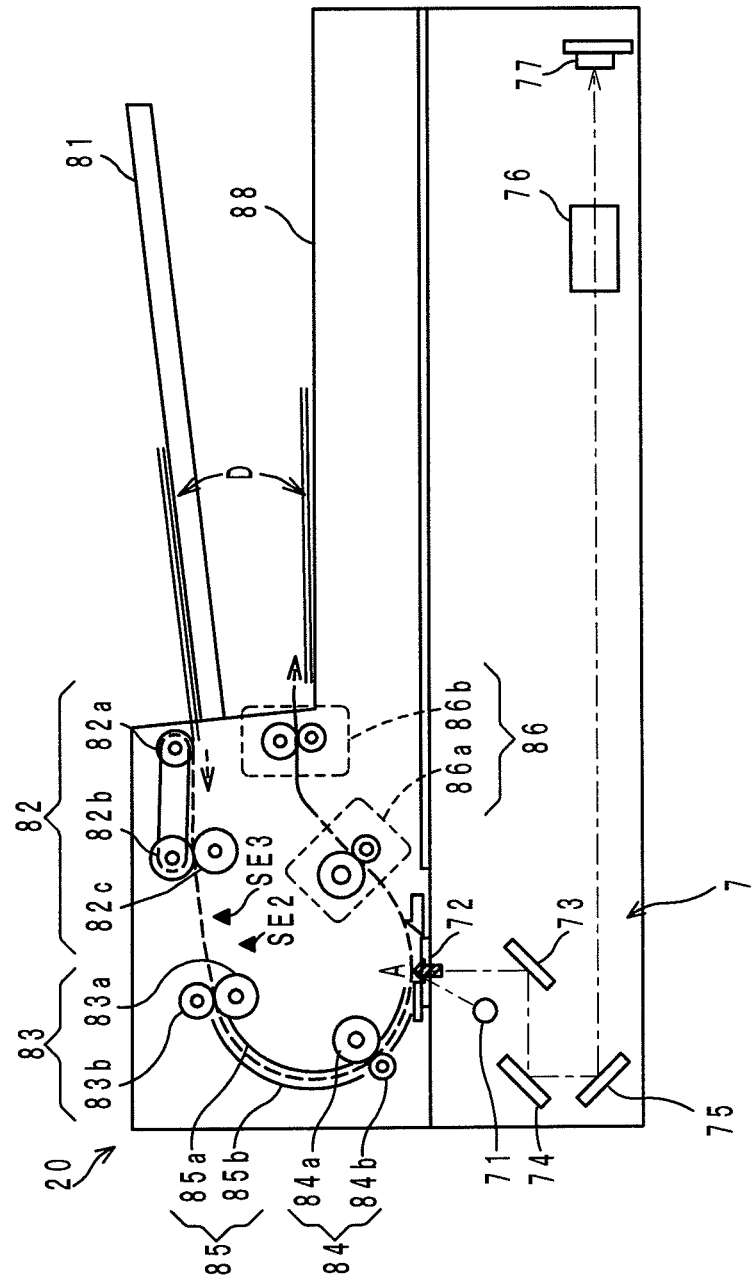
FIG. 10 is a schematic view illustrating a general configuration of a document reading apparatus according to a third embodiment.
Figure 11:
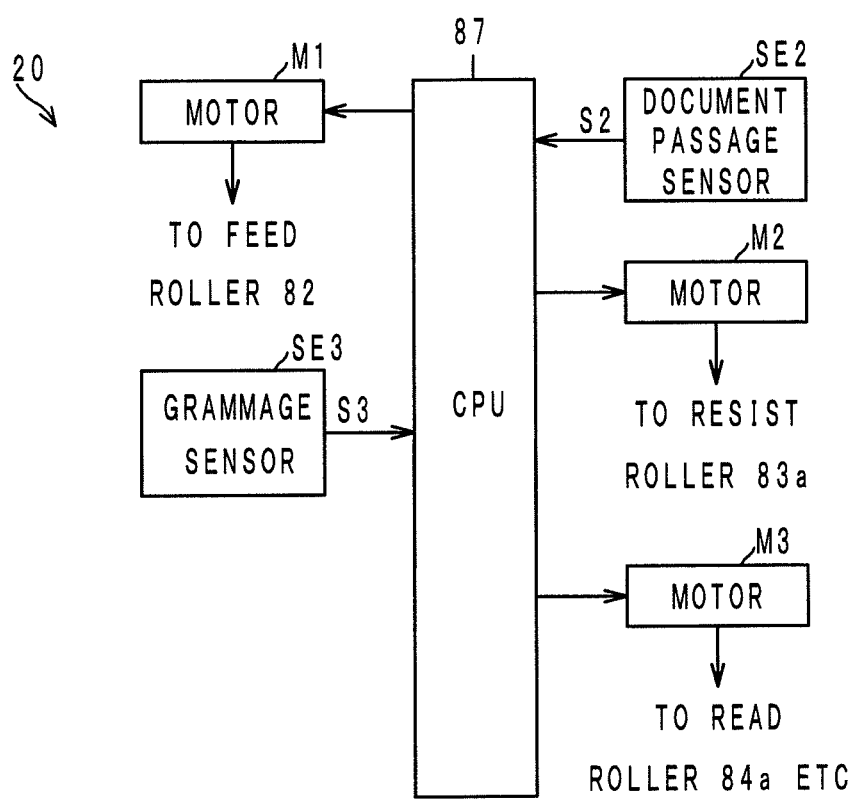
FIG. 11 is a schematic diagram illustrating a block configuration of an ADF of FIG. 10.

In FIGS. 10 and 11, an ADF 20 differs from the ADF 8 shown in FIGS. 1 and 2 in that a grammage sensor SE3 is provided along with the sensors SE0 and SE1 (note that the sensors SE0 and SE1 are not shown in FIGS. 10 and 11). The grammage sensor SE3 is an active sensor using ultrasonic waves, for example, and is disposed slightly on the upstream side of the nip between the rollers 83a and 83b, such that the conveyance path is positioned between the transmission and reception sides of the sensor. In the sensor SE3, the transmission side outputs ultrasonic waves to the reception side, which outputs a signal S3 indicating the grammage of a document D, to the CPU 87 on the basis of the received ultrasonic waves.

Figure 12:
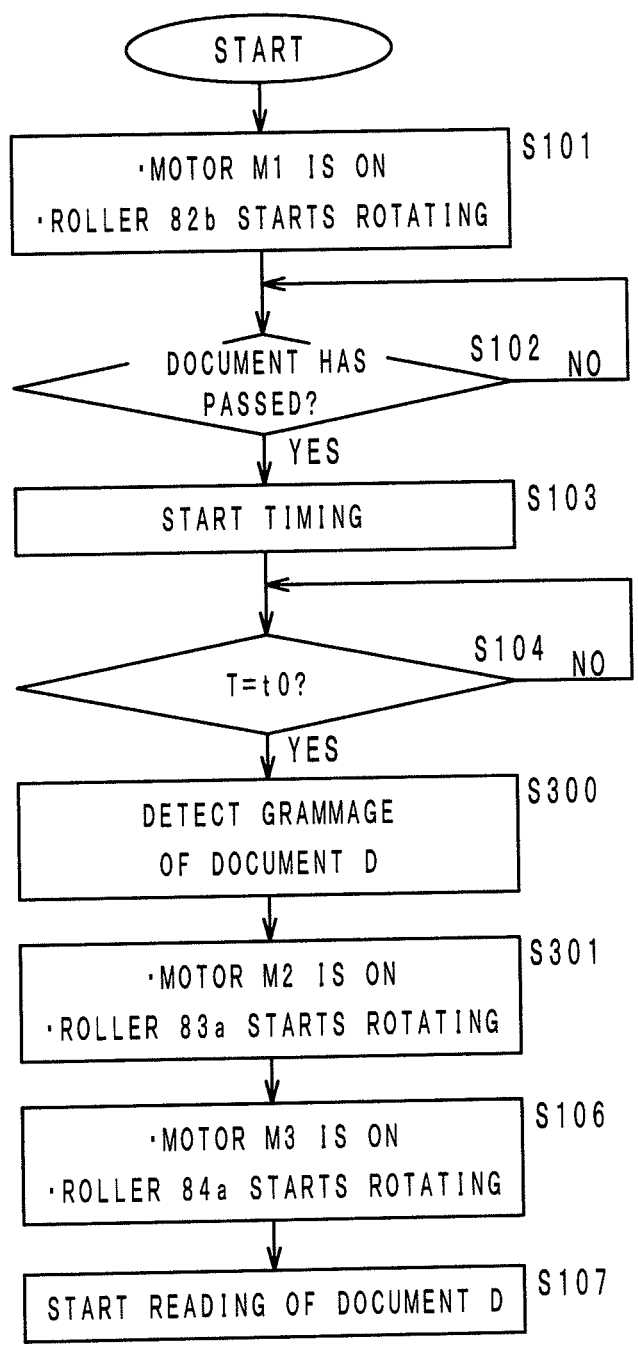
FIG. 12 is a flowchart illustrating the operation of the ADF of FIG. 10.

Next, referring to a flowchart of FIG. 12, the operation of the document reading apparatus will be described. The user places a document D on the tray 81, and then presses a start button of an unillustrated operating panel. In response to this, S101 to S104 mentioned earlier are executed. Thereafter, the CPU 87 detects the grammage of the document D on the basis of an output signal S3 of the sensor SE3 (S300). Subsequently, the motor M2 starts rotationally driving the resist roller 83a under control of the CPU 87 (S301). Here, if the grammage of the document D determined in S300 is greater than or equal to 157 g/m² (equivalent to a thickness of 0.23 mm), the conveying velocity of the resist roller 83a is set to a value obtained by multiplying the conveying velocity of the read roller 84a, 250 mm/s, by a predetermined conveying velocity ratio, either the following fifth or sixth conveying velocity ratio K5 or K6.

For documents D 170 mm or longer: K5=1.0125
For documents D less than 170 mm long: K6=0.9923

Note that if the grammage is less than 157 g/m², the first or second conveying velocity ratio K1 or K2 described in the first embodiment is used. As is apparent from comparison of both, the conveying velocity ratios K5 and K6 for documents D with a grammage of 157 g/m² or more are 0.5% higher than the conveying velocity ratios K1 and K2, respectively, for a grammage of less than 157 g/m².

As a result of this series of processing steps, if T=t0, the resist roller 83a feeds the document D at a conveying velocity obtained by multiplying the conveying velocity 250 mm/s by the conveying velocity ratio being set.

After the driving of the motor M2 starts, S106 mentioned above is performed to start rotationally driving the read roller 84a, so that the document D is fed at a conveying velocity of 250 mm/s from between the rollers 84a and 84b, which are being rotated, to the reading position A shown in FIG. 10.

Incidentally, as described in the "Description of Related Art" section, the conventional document reading apparatuses have the problem of not being able to set an appropriate slack in accordance with the grammage of the document D. To address this problem, for thick documents D, the feed rate of the resist roller 83a tends to be reduced due to slippage, and therefore if the sensor SE3 detects a document D of a predetermined reference value (e.g., 157 g/m²) or more, the conveying velocity ratio is increased such that the feed rate of the resist roller 83a is higher than that for documents D of less than the reference value.

Modification to Third Embodiment

Note that in the case of the double-side reading mode with the grammage of a document D at 157 g/m² or more, the conveying velocity ratio as mentioned above may be used to read the obverse side of the document D. As a conveying velocity ratio for reading the reverse side, the following seventh or eighth conveying velocity ratio K7 or K8 (which is 0.5% higher than the third or fourth conveying velocity ratio K3 or K4 for documents D with a grammage of less than 157 g/m²) is used.

For documents D 170 mm or longer: K7=1.0050
For documents D less than 170 mm long: K8=0.9946

Although the present invention has been described in connection with the preferred embodiment above, it is to be noted that various changes and modifications are possible to those who are skilled in the art. Such changes and modifications are to be understood as being within the scope of the invention.

What is claimed is:

1. A sheet-through document reading apparatus comprising:
    a document tray on which a document is capable of being placed;
    a feed unit operable to feed the document on the document tray;
    a resist convey unit operable to perform consistency processing on the document fed by the feed unit;
    a first drive unit operable to rotationally drive the resist convey unit;
    a read convey unit operable to feed the document subjected to consistency processing by the resist convey unit;
    a second drive unit operable to rotationally drive the read convey unit;
    a reading unit operable to read, at a fixed reading position, the document conveyed by the read convey unit;
    a side-reversing convey unit operable to reverse a document whose obverse side has been read by the reading unit, and to refeed the reversed document to the resist convey unit not via the feed unit so as to permit a reverse side of the document to be read by the reading unit; and
    a control unit controlling a ratio of a conveying velocity of the resist convey unit to a conveying velocity of the read convey unit such that the ratio while the document is being fed for reading of the obverse side of the document is greater than the ratio while the document is being refed to the resist convey unit by the side-reversing convey unit for reading of the reverse side of the document.

2. The sheet-through document reading apparatus according to claim 1, wherein,
the control unit controls the ratio of the conveying velocity of the resist convey unit to the conveying velocity of the read convey unit such that the ratio when the document has a length in a feeding direction equal to or greater than a first reference value is greater than the ratio when the document has a length in the feeding direction less than the first reference value.

3. The sheet-through document reading apparatus according to claim 1, wherein the feed unit is operable to separate the document with a load torque of 500 gfcm.

4. The sheet-through document reading apparatus according to claim 1, wherein,
if there are documents of different lengths in a feeding direction on the document tray, the control unit changes the ratio of the conveying velocity of the resist convey unit to the conveying velocity of the read convey unit on the basis of a maximum length of the documents.

5. A sheet-through document reading apparatus comprising:
a document tray on which a document is capable of being placed;
a feed unit operable to feed the document on the document tray;
a resist convey unit operable to perform consistency processing on the document fed by the feed unit;
a first drive unit operable to rotationally drive the resist convey unit;
a read convey unit operable to feed the document subjected to consistency processing by the resist convey unit;
a second drive unit operable to rotationally drive the read convey unit;
a reading unit operable to read, at a fixed reading position, the document conveyed by the read convey unit;
a side-reversing convey unit operable to reverse a document whose obverse side has been read by the reading unit, and to refeed the reversed document to the resist come unit not via the feed unit so as to permit a reverse side of the document to be read by the reading unit; and
a control unit controlling a ratio of a conveying velocity of the resist convey unit to a conveying velocity of the read convey unit such that the ratio while the document is being fed for reading of the obverse side of the document is greater than the ratio while the document is being refed to the resist convey unit by the side-reversing convey unit for reading of the reverse side of the document, wherein the control unit further changes the ratio of the conveying velocity of the resist convey unit to the conveying velocity of the read convey unit on the basis of a grammage of the document.

6. A sheet-through document reading apparatus comprising:
a document tray on which a document is capable of being placed;
a determination unit operable to determine a grammage of the document;
a feed unit operable to feed the document on the document tray;
a resist convey unit operable to perform consistency processing on the document fed by the feed unit;
a first drive unit operable to rotationally drive the resist convey unit;
a read convey unit operable to feed the document subjected to consistency processing by the resist convey unit;
a second drive unit operable to rotationally drive the read convey unit;
a reading unit operable to read, at a fixed reading position, the document conveyed by the read convey unit; and
a control unit changing a relative conveying velocity between the resist convey unit and the read convey unit on the basis of a result of the determination by the determination unit.

7. The sheet-through document reading apparatus according to claim 6, further comprising a grammage sensor that is provided in a document path, on the upstream side of the resist convey unit and operable to detect the grammage of the document, wherein,
the determination unit is operable to determine the gray age of the document on the basis of a result of the detection by the grammage sensor.

8. The sheet-through document reading apparatus according to claim 1, wherein,
the control unit further changes the ratio of the conveying velocity of the resist convey unit to the conveying velocity of the read convey unit on the basis of a length of the document in a feeding direction.

9. The sheet-through document reading apparatus according to claim 1, wherein,
the feed unit is operable to feed a plurality of documents placed on the tray one by one while separating one document from the other.

10. The sheet-through document reading apparatus according to claim 1, wherein,
the feed unit comprises a feed member operable to come into contact with the document placed on the tray to pick up the document.

11. The sheet-through document reading apparatus according to claim 5, wherein,
the control unit controls the ratio of the conveying velocity of the resist convey unit to the conveying velocity of the read convey unit such that the ratio when the document has a grammage equal to or greater than a second reference value is greater than the ratio of the conveying velocity of the resist convey unit to the conveying velocity of the read convey unit when the document has a grammage less than the second reference value.

12. The sheet-through document reading apparatus according to claim 11, wherein,
the control unit controls the ratio of the conveying velocity of the resist convey unit to the conveying velocity of the read convey unit such that the ratio when the document has a length in a feeding direction equal to or greater than a first reference value and a grammage equal to or greater than the second reference value is greater than the ratio when the document has a length in the feeding direction less than the first reference value and a grammage less than the second reference value.

13. The sheet-through document reading apparatus according to claim 1, further comprising a determination unit operable to determine a length of the document in a feeding direction, wherein,
the control unit controls the ratio of the conveying velocity of the resist convey unit to the conveying velocity of the read convey unit on the basis of the length of the document determined by the determination unit.

14. The sheet-through document reading apparatus according to claim 6, wherein,
the control unit further changes the relative conveying velocity between the resist convey unit and the read convey unit on the basis of a length of the document in a feeding direction.

15. The sheet-through document reading apparatus according to claim 6, wherein, the control unit controls the relative conveying velocity between the resist convey unit and the read convey unit such that a ratio of a conveying velocity of the resist convey unit to a conveying velocity of the read convey unit when the document has a length in a feeding direction equal to or greater than a first reference value is greater than the ratio of the conveying velocity of the resist convey unit to the conveying velocity of the read convey unit when the document has a length in the feeding direction less than the first reference value.

16. The sheet-through document reading apparatus according to claim 6, wherein,
the control unit controls the relative conveying velocity between the resist convey unit and the read convey unit such that a ratio of a conveying velocity of the resist convey unit to a conveying velocity of the read convey unit when the document has a grammage equal to or greater than a second reference value is greater than the ratio of the conveying velocity of the resist convey unit to the conveying velocity of the read convey unit when the document has a grammage less than the second reference value.

17. The sheet-through document reading apparatus according to claim 6, wherein,
the control unit controls the relative conveying velocity between the convey unit and the read convey unit such that a ratio of a conveying velocity of the resist convey unit to a conveying velocity of the read convey unit when the document has a length in a feeding direction equal to or greater than a first reference value and a grammage equal to or greater than a second reference value is greater than the ratio of the conveying velocity of the resist convey unit to the conveying velocity of the read convey unit when the document has a length in the feeding direction less than the first reference value and a grammage less than the second reference value.

\* \* \* \* \*